United States Patent
Shaik et al.

(10) Patent No.: US 10,756,598 B2
(45) Date of Patent: Aug. 25, 2020

(54) METHOD AND APPARATUS FOR COOLING A ROTOR ASSEMBLY

(71) Applicant: GE Aviation Systems LLC, Grand Rapids, MI (US)

(72) Inventors: Mohammad Khaja Mohiddin Shaik, Karnataka (IN); David Raju Yamarthi, Karnataka (IN); Balamurugan Sridharan, Karnataka (IN); Anirban Chatterjee, Karnataka (IN); Prateek Jalan, Karnataka (IN)

(73) Assignee: GE Aviation Systems LLC, Grand Rapids, MI (US)

(*) Notice: Subject to any disclaimer, the term of this patent is extended or adjusted under 35 U.S.C. 154(b) by 380 days.

(21) Appl. No.: 15/722,630

(22) Filed: Oct. 2, 2017

(65) Prior Publication Data
US 2019/0103786 A1 Apr. 4, 2019

(51) Int. Cl.
*H02K 9/19* (2006.01)
*H02K 3/24* (2006.01)
*H02K 3/18* (2006.01)

(52) U.S. Cl.
CPC .............. *H02K 9/19* (2013.01); *H02K 3/24* (2013.01); *H02K 3/18* (2013.01)

(58) Field of Classification Search
CPC .............. H02K 9/19; H02K 3/24; H02K 3/18
See application file for complete search history.

(56) References Cited

U.S. PATENT DOCUMENTS

| | | | |
|---|---|---|---|
| 5,030,863 A * | 7/1991 | Yoshimura | H02K 9/20 310/198 |
| 6,727,609 B2 | 4/2004 | Johnsen | |
| 6,734,585 B2 | 5/2004 | Lengel | |
| 7,146,707 B2 | 12/2006 | Lengel | |
| 7,489,057 B2 * | 2/2009 | Zhou | H02K 9/19 310/61 |
| 8,138,642 B2 | 3/2012 | Ganong | |
| 8,450,888 B2 | 5/2013 | Toot | |
| 9,300,189 B2 | 3/2016 | Stark | |
| 9,641,051 B2 | 5/2017 | Kalev | |
| 2003/0193256 A1* | 10/2003 | Liebermann | H02K 3/24 310/194 |
| 2011/0109095 A1 | 5/2011 | Stiesdal | |
| 2012/0104884 A1* | 5/2012 | Wagner | H02K 1/32 310/54 |

(Continued)

FOREIGN PATENT DOCUMENTS

| | | | |
|---|---|---|---|
| CN | 104011983 A | 8/2014 | |
| CN | 105377167 A | 3/2016 | |
| CN | 206442203 U * | 8/2017 | .............. H02K 1/32 |

OTHER PUBLICATIONS

English translation for CN206442203U, Lin et al., "Cooling System of High Speed Permanent Magnet Motors Rotor", Aug. 2017 (Year: 2017).*

(Continued)

*Primary Examiner* — Emily P Pham
(74) *Attorney, Agent, or Firm* — McGarry Bair, P.C.

(57) ABSTRACT

A method and apparatus for cooling a rotor assembly includes a rotor core having a rotatable shaft and defining at least one rotor post, a winding wound around the post, and at least one coolant conduit supported by the rotor core and in a thermally conductive relationship with a portion of the winding.

19 Claims, 7 Drawing Sheets

(56) References Cited

U.S. PATENT DOCUMENTS

| | | | |
|---|---|---|---|
| 2013/0015729 A1* | 1/2013 | Birdi | H02K 1/32 |
| | | | 310/54 |
| 2013/0225415 A1* | 8/2013 | Kim | H02K 9/005 |
| | | | 505/163 |
| 2014/0175916 A1 | 6/2014 | Chamberlin | |
| 2015/0048699 A1 | 2/2015 | Himmelmann | |
| 2016/0020673 A1* | 1/2016 | Pal | H02K 9/005 |
| | | | 310/54 |
| 2016/0149451 A1* | 5/2016 | Teter | H02K 1/325 |
| | | | 310/54 |
| 2016/0164377 A1 | 6/2016 | Tang | |
| 2017/0207683 A1* | 7/2017 | Anghel | H02K 9/197 |
| 2018/0323683 A1* | 11/2018 | Stieger | H02K 3/22 |

OTHER PUBLICATIONS

Machine translation of Office Action of Chinese Patent Office 201811141243, dated Apr. 26, 2020, 5 pages (Year: 2020).*
Machine translation of CN104011983A, dated Aug. 27, 2014, 25 pages (Year: 2014).*
International Publication No. WO 2013/096946, dated Jun. 27, 2013, 56 pages (Year: 2013).*
Chinese Patent Office, Office Action re Corresponding Application No. 201811141243.1, dated Apr. 26, 2020, 8 pages, China.

* cited by examiner

10,756,598 B2

METHOD AND APPARATUS FOR COOLING A ROTOR ASSEMBLY

BACKGROUND OF THE INVENTION

Contemporary aircraft engines include electric machines, or generator systems, which utilize a running aircraft engine in a generator mode to provide electrical energy to power systems and components on the aircraft. Some aircraft engines can further include starter/generator systems, which act as a motor to start an aircraft engine, and as a generator to provide electrical energy to power systems on the aircraft after the engine is running. Motors and generators can be wet cavity systems, wherein a cavity housing the rotor and stator is exposed to liquid coolant, or dry cavity systems, wherein the cavity is not exposed to liquid coolant. Dry cavity systems can also utilize liquid coolant in one or more contained cooling systems, but they are still considered dry cavity so long as the cavity is not exposed to liquid coolant. The operating requirements or the operating environment of a generator system can increase the cooling requirements for either a wet cavity or dry cavity system. For example, generator systems proximate to the high temperature environment of a turbine engine can increase the need for improved cooling capabilities.

BRIEF DESCRIPTION OF THE INVENTION

In one aspect, the present disclosure relates to a rotor assembly for an electric machine including a rotor core having a rotatable shaft and defining at least one rotor post, a winding wound around the post, a first coolant conduit supported by the rotor core extending axially along the post underlying the winding, and wherein least one face of the first coolant conduit is in a thermally conductive relationship with an underlying portion of the windings, and a second coolant conduit supported by the rotor core extending axially along the post overlying the winding, and wherein least one face of the second coolant conduit is in a thermally conductive relationship with an overlying portion of the winding. Heat from the winding is transferred by conduction to the first and the second coolant conduits.

In another aspect, the present disclosure relates to a rotor assembly for an electric machine including a rotor core having a rotatable shaft and defining at least one rotor post, a set of rotor windings wound around the post, a first coolant conduit supported by the rotor core extending axially along the post radially underlying the set of rotor windings, and wherein least one face of the first coolant conduit is in a thermally conductive relationship with a bottom portion of the set of rotor windings, and a second coolant conduit supported by the rotor core extending axially along the post radially overlying the set of rotor windings, and wherein least one face of the second coolant conduit is in a thermally conductive relationship with a top portion of the set of rotor windings. The set of rotor windings include a set of radial through-openings fluidly connecting the first cooling conduit with the second coolant conduit.

In yet another aspect, the present disclosure relates to a method of cooling a rotatable electric machine rotor, including receiving a fluid coolant flow to a first coolant conduit extending axially along an underlying portion of a set of rotor windings, wherein least one face of the first coolant conduit is in a thermally conductive relationship with the underlying portion of the set of rotor windings, and delivering the fluid coolant flow to a second coolant conduit extending axially along an overlying portion of the set of rotor windings, and wherein least one face of the second coolant conduit is in a thermally conductive relationship with the overlying portion of the windings, and fluidly connected with the first coolant conduit by a set of radial openings through the set of windings. The fluid coolant flow removes heat from the rotor.

DESCRIPTION OF EMBODIMENTS OF THE INVENTION

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Figure 1:
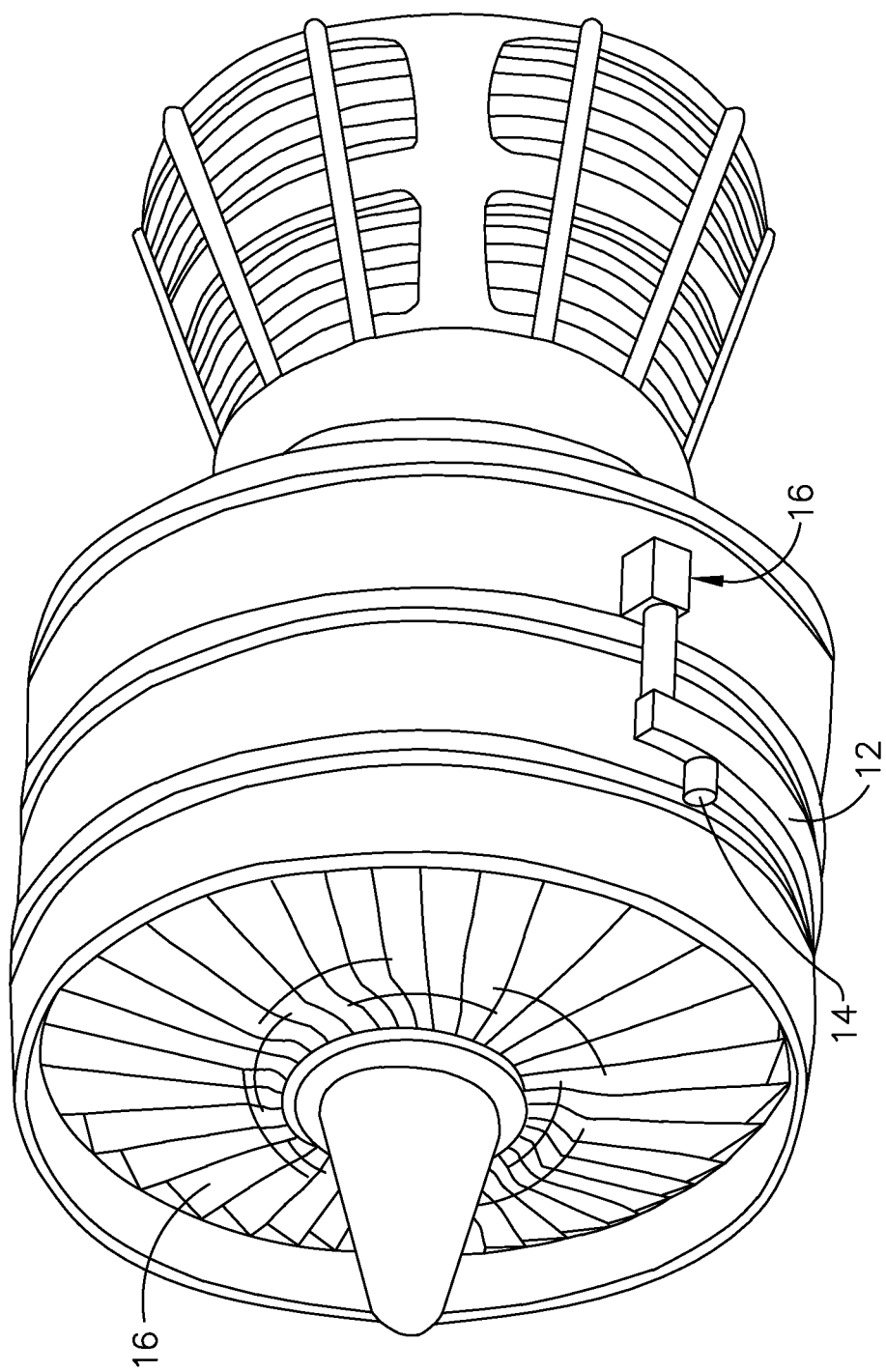
FIG. 1 is an isometric view of a gas turbine engine having a generator, in accordance with various aspects described herein.

FIG. 1 illustrates a gas turbine engine 10 having an accessory gear box (AGB) 12 and a generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The gas turbine engine 10 can also have an afterburner that burns an additional amount of fuel downstream of the low pressure turbine region to increase the velocity of the exhausted gases, and thereby to increase thrust. The AGB 12 can be coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine or generator.

Figure 2:
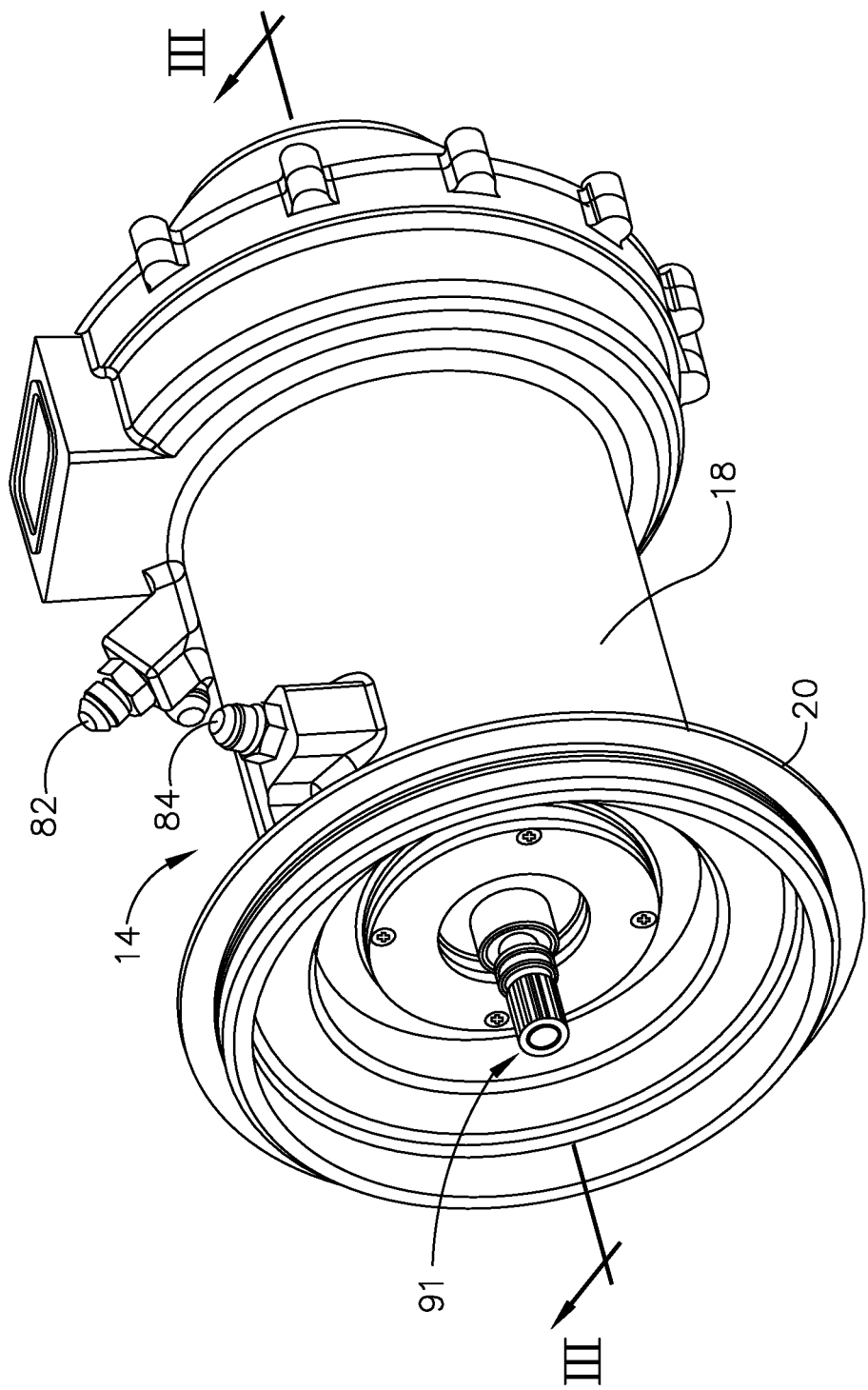
FIG. 2 is an isometric view of an exterior of the generator of FIG. 1, in accordance with various aspects described herein.

FIG. 2 more clearly illustrates the generator 14 and its housing 18, which can include a clamping interface 20, used to clamp the generator 14 to the AGB 12. Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 includes a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a stator of the generator 14. The liquid cooling system can also include a second coolant outlet port 91, shown at a rotatable shaft portion of the generator 14 (described below). While only a coolant outlet port 91 is shown in the illustrated isometric view, a rotor or rotatable shaft coolant inlet port can be included. While not shown, aspects of the disclosure can further include other liquid cooling system components, such as a liquid coolant reservoir fluidly coupled with the cooling fluid inlet port 82 and cooling fluid outlet port 84, and a liquid coolant pump to forcibly supply the coolant through the ports 82, 84 or generator 14. Oil is merely one non-limiting example of a liquid coolant that can be used in aspects of the disclosure.

Figure 3:
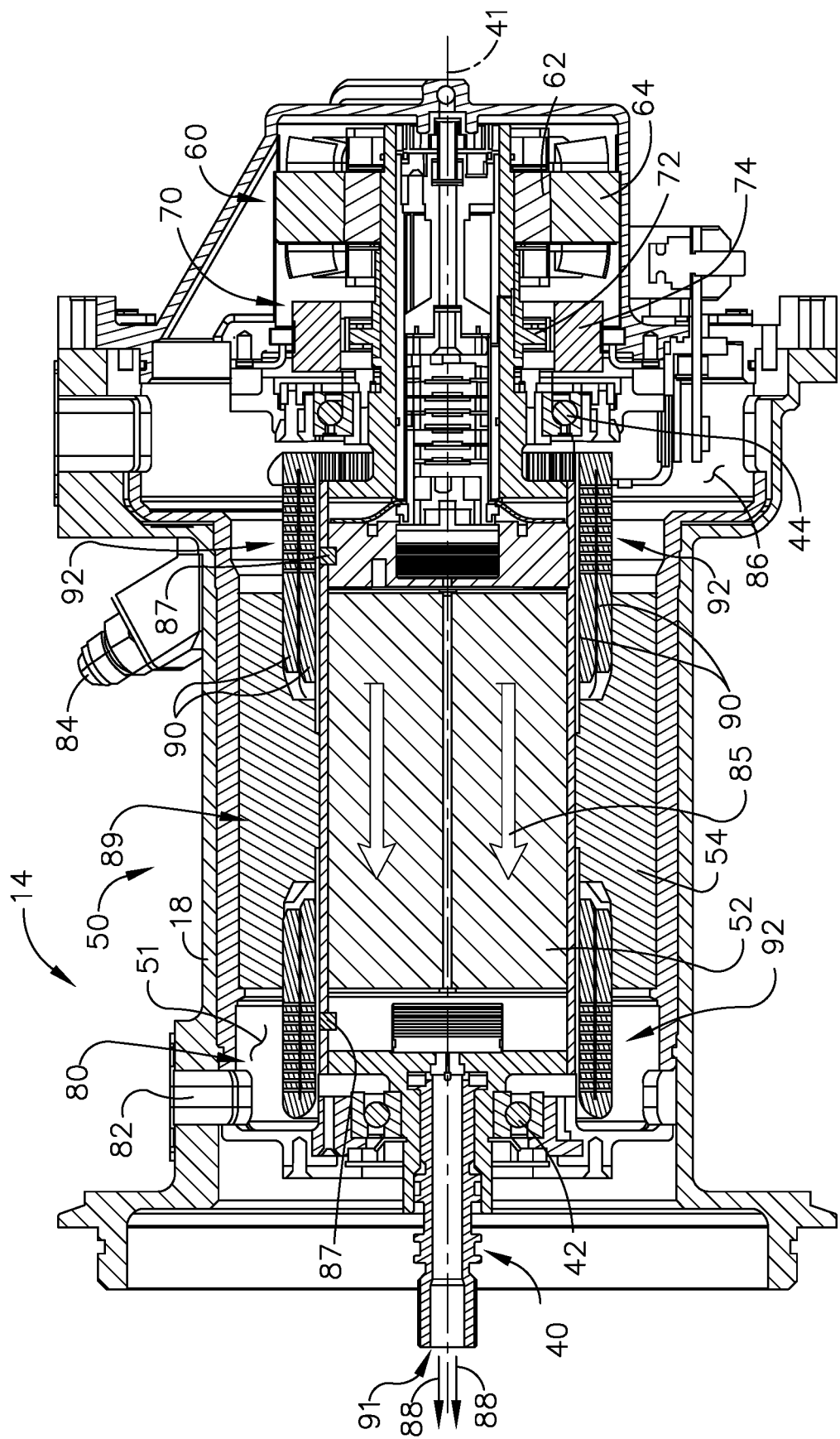
FIG. 3 is a schematic cross-sectional view of the generator of FIG. 2, taken along line of FIG. 2, in accordance with various aspects described herein.

The interior of the generator 14 is best seen in FIG. 3, which is a sectional view of the generator 14 shown in FIG. 2. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about axis of rotation 41. Several of the elements of the generator 14 have a fixed component and a rotating component, with the rotating component being provided on the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on the rotatable shaft 40. The fixed components can be mounted to any suitable part of the housing 18. The main machine stator 54, exciter stator 64, and PMG stator 74 define an interior through which the rotatable shaft 40 extends.

It will be understood that the main machine rotor 52, exciter rotor 62, and PMG rotor 72 can have a set of rotor poles, including, but not limited to two rotor poles, and that the main machine stator 54, exciter stator 64, and PMG stator 74 can have a set of stator teeth or stator poles, including, but not limited to two stator teeth or stator poles. The set of rotor poles can generate a set of magnetic fields relative to the set of stator poles, such that the generator 14 can operate through the interaction of the magnetic fields and current-carrying conductors to generate force or electrical power. The exciter 60 can provide direct current to the main machine 50 and the main machine 50 and PMG 70 can supply AC electrical power when the rotatable shaft 40 rotates.

At least one of the rotor poles and stator teeth or stator poles can be formed by a core with a post and wire wound about the post to form a winding, with the winding having at least one end turn. Aspects of the disclosure shown include at least one set of stator windings 90 arranged longitudinally along the stator housing 18, that is, in parallel with housing 18 and the rotor axis of rotation 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity system having the cooling system 80 illustrated as including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more flow channels or paths (shown as arrows 85) for the main machine rotor 52, exciter rotor 62, and PMG rotor 72, as well as an rotor shaft oil outlet 88, such as the outlet port 91, wherein residual, unused, or unspent oil can be discharged from the rotatable shaft 40.

As shown, the main machine rotor 52 can further include at least one fluid port 87, illustrated as two axially spaced (e.g. along the longitudinal axis of the main machine rotor 52) fluid ports 87 such as a spray nozzle, in fluid communication with the one or more flow channels 85 and configured to expose at least a portion of the main machine cavity 51 to the coolant passing though the channels 85. For example, as the rotatable shaft 40 rotates, the at least one fluid port 87 can be rotated about the shaft 40 such that cooling fluid traversing the flow channels 85 can be exposed, sprayed, or otherwise deposited through the at least one fluid port 87 into the cavity 51, such as onto the set of stator windings 90, set of stator winding end turns 92, or onto alternative or additional components proximate to the rotational path of the fluid port 87.

Figure 4:
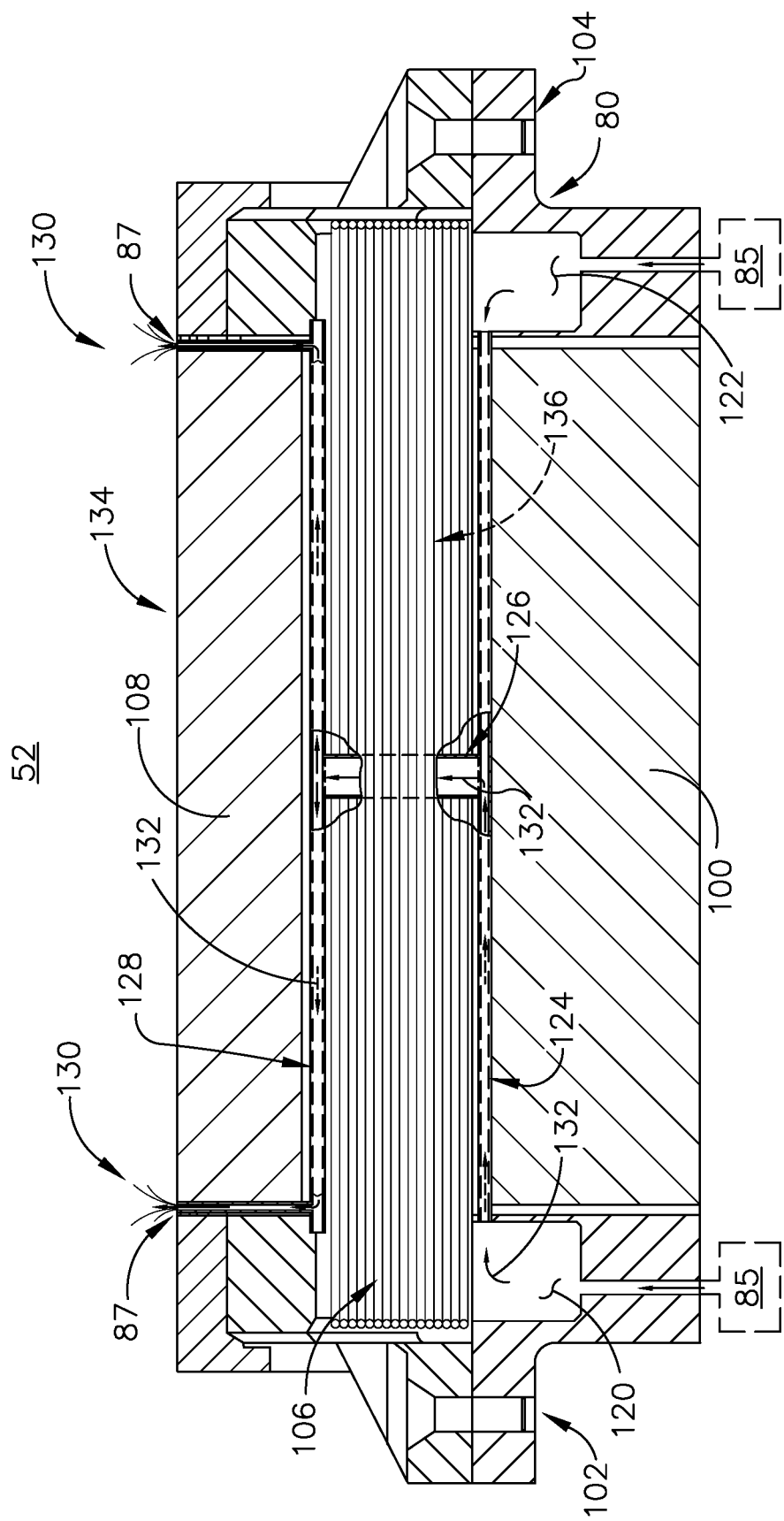
FIG. 4 illustrates a zoomed cross-sectional view of a rotor portion of the generator of FIG. 3, including a liquid cooling circuit, in accordance with various aspects described herein.

FIG. 4 illustrates a zoomed view of the main machine rotor 52 or rotor assembly, for better understanding of the operation and effect of the cooling system 80. As shown, the main machine rotor 52 can include a rotor core 100, such as a laminated rotor core, rotatably connected to co-rotate with the rotatable shaft 40. The main machine rotor 52 can further define a first end 102 of the rotor 52 and a second end 104 of the rotor 52, spaced axially from the first end 102. The main machine rotor 52 can include at least one rotor pole 134 defined by a post formed when at least a portion of the rotor core 100 is wound with conductive wiring (i.e. a "winding") about the post. Non-limiting aspects of the winding can include at least one end turn, that is, when the conductive wiring is wound about the axial end of the post. Collectively, the multiple winding of the conductive wiring forms a set of rotor windings 106. In the perspective of the illustrated example, the rotor post 136 can underlie the set of rotor windings 106.

Each set of rotor windings 106, while continuous, can be thought of as having axial segments that run along opposite sides of the pole (e.g. in parallel with the axis of rotation), with opposing end turn segments on opposite ends 102, 104 of the rotor core 100 connecting the axial segments. While only one example of a set of rotor windings 106 are illustrated, aspects of the disclosure can include having multiple sets or rotor windings 106 configured about one or more circumferentially spaced poles 134 of the main machine rotor 52.

Each pole 134 of the main machine rotor 52 can further include a cap 108, at least partially overlaying each pole 134 and set of rotor windings 106. In one non-limiting example, the rotor core 100 and cap 108 can be formed or comprised by a plurality of laminations, for instance, cobalt laminations. Cobalt laminations are merely one example of a material used to construct the core 100 or cap 108, and alternate material composition or compositions may be included.

The cooling system 80 for the main machine rotor 52 can include a set or series of fluid conduits, passageways, or the like, wherein a coolant fluid can be supplied or otherwise delivered there through for removing heat from the main machine rotor 52, the set of rotor windings 106, or a combination thereof. As shown, a portion of the rotor core 100 proximate to the first end 102 can define a first coolant cavity 120 or reservoir fluidly connected with the oil flow channel 85 of the rotor 52 (schematically illustrated). Similarly, another portion of the rotor core 100 proximate to the second end 104 can define a second coolant cavity 122 or reservoir fluidly connected with the oil flow channel 85 of the rotor 52. In this example, each of the first or second coolant cavities 120, 122 can receive a fluid coolant flow (illustrated schematically as arrows 132) from the oil flow channel 85, or another coolant source.

The cooling system 80 of the main machine rotor 52 can also include a first coolant conduit 124 supported by the rotor core 100 and adapted, configured, disposed, or the like to extend axially along the rotor post 136 or pole 134 underlying the set of rotor windings 106. In this example, "underlying" denotes a relative position radially closer to the axis of rotation, relative to the set of rotor windings 106, between the set of stator windings 106 and the rotor core 100. Stated another way, in the perspective of FIG. 4, the first coolant conduit 124 runs parallel to, and beneath or under the lower or bottom surface of the set of rotor windings 106. At least one face of the first coolant conduit 124 can be in a thermally conductive relationship with the underlying portion or face of the set of rotor windings 106.

The cooling system 80 of the main machine rotor 52 can also include a second coolant conduit 128 supported by the rotor core 100 and adapted, configured, disposed, or the like to extend axially along the rotor post 136 or pole 134 overlying the set of rotor windings 106. In this example, "overlying" denotes a relative position radially farther from the axis of rotation, relative to the set of rotor windings 106, between the set of stator windings 106 and, for example, the cap 108. Stated another way, in the perspective of FIG. 4, the second coolant conduit 128 runs parallel to, and above or over the upper or top surface of the set of rotor windings 106. At least one face of the second coolant conduit 128 can be in a thermally conductive relationship with the overlying portion or face of the set of rotor windings 106.

The cooling system 80 of the main machine rotor 52 can also include a set of radial openings 126 extending in a radial orientation through the set of rotor windings 106, and fluidly connecting the first coolant conduit 124 with the second fluid conduit 128. In one non-limiting example, the set of rotor windings 106 can be cut, formed, wound, or otherwise configured such that the set of windings 106 themselves define the set of radial through-openings 126. In another non-limiting example, the set of rotor windings 106 can include a set of independently-formed conduits or passages (e.g. a housing having sidewalls defining a fluid channel) disposed in, around, or in between the conductive wires of the set of rotor windings 106. The set of radial openings 126 can also be in a thermally conductive relationship with a portion of the set of rotor windings 106 passed by the set of radial openings 126.

Thus, aspects of the disclosure can include a cooling system 80 defined by, or including a coolant flow path (for example, denoted by the fluid coolant flow 132), whereby coolant supplied from a coolant source (such as the oil flow channel 85) can be provided to a first coolant conduit 124, and traverse the first coolant conduit 124 parallel to and underlying an axial segment of the set of rotor windings 106. The coolant flow path can further be provided from the first coolant conduit 124, through the set of radial openings 126, to the second coolant conduit 128, whereby coolant can traverse the second coolant conduit 128 parallel to and overlying an axial segment of the set of rotor windings 106. The coolant fluid coolant flow 132 can receive a conductive transfer of heat from the set of rotor windings 106, the proximate portions of the rotor core 100, the cap 108, or a combination thereof, and carry away the aforementioned heat, effectively or operably cooling the main machine rotor 52.

Non-limiting aspects of the disclosure can be included wherein the second coolant conduit 128 is further fluidly connected with at least one fluid port 87 or nozzle disposed at the outer radius of the main machine rotor 52. In this sense, the fluid port 87 can be adapted to direct a fluid coolant flow 132 away from the rotor 52, for instance, toward the set of stator windings (not shown). In the illustrated example, the fluid port 87 or nozzle can direct the fluid coolant flow 132 in a spray pattern 130. As shown, the second coolant conduit 128 can be fluidly connected with a set of axially spaced fluid ports 87. In this sense, the cooling system 80 can be included in the wet cavity generator to further cool the set of stator windings, as described herein.

As described herein, the fluid coolant flow 132 can be defined in a sequentially-directed flow pathway including the first coolant conduit 124, the set of radial openings 126, and the second coolant conduit 128, or a combination thereof.

Figure 5:
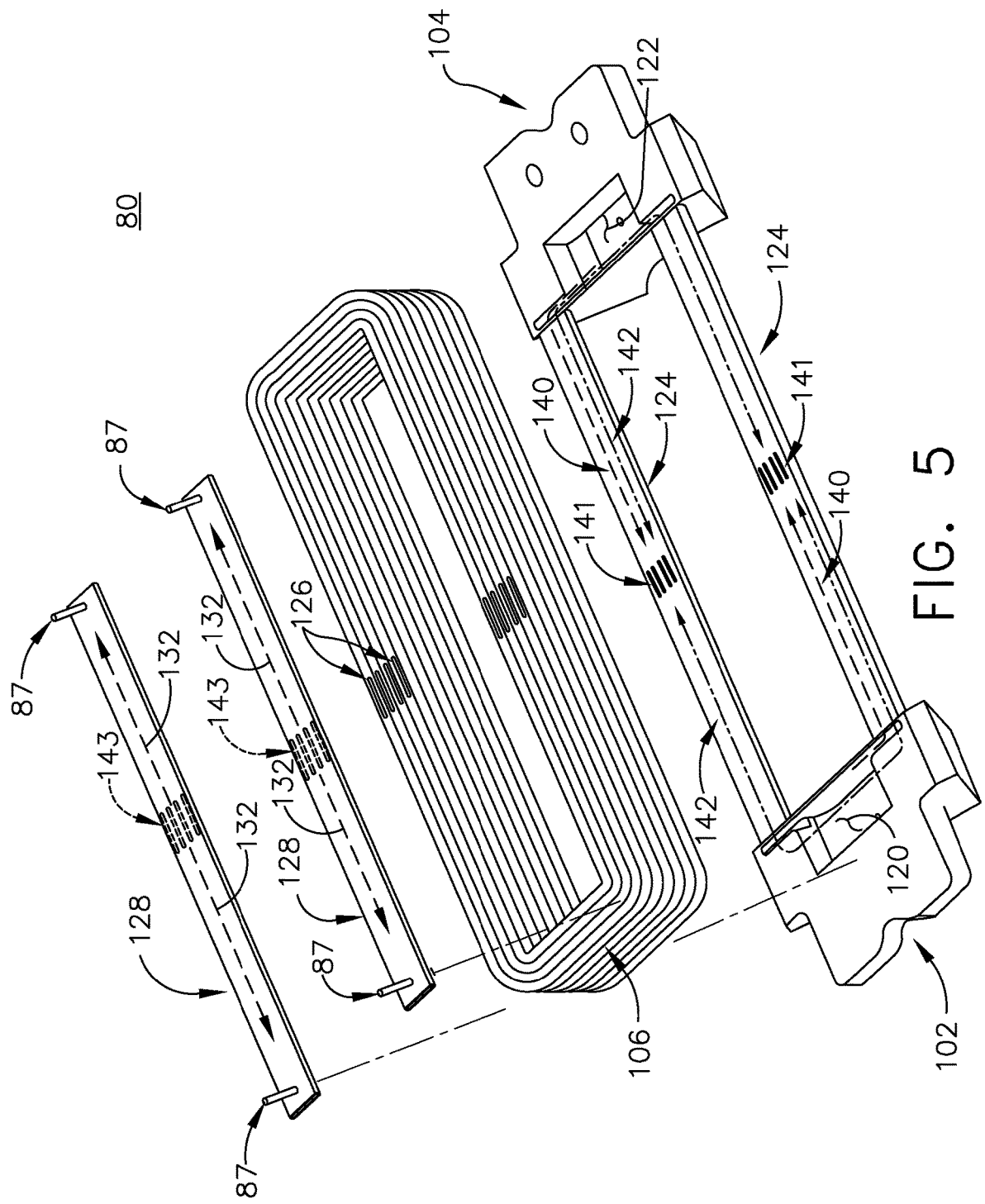
FIG. 5 illustrates an exploded isometric view of rotor winding and the liquid cooling circuit, in accordance with various aspects described herein.

FIG. 5 illustrated a radially-exploded isometric view of the cooling system 80 of the main machine rotor 52, that is, with the rotor core 100, post 136, and cap 108 removed, for ease of understanding. As shown, the set of rotor windings 106 can include two axially-extending legs, wherein each leg includes a set of radial openings 126 through the windings 106. In turn, matching, aligned, or corresponding dual axially-extending first coolant conduits 124 can underlie the set of rotor winding 106 legs, and matching, aligned, or corresponding dual axially-extending second coolant conduits 128 can overly the set of rotor winding 106 legs. Each respective first coolant conduit 124 can include a set of fluid outlets 141 on the upper surface (e.g. facing the set of rotor windings 106) matching, aligned, or corresponding with the set of radial openings 126. Likewise, each respective second coolant conduit 128 can include a set of fluid inlets 143 on the lower surface (e.g. facing the set of rotor windings 106) matching, aligned, or corresponding with the set of radial openings 126.

As shown, the dual first coolant conduits 124 and the dual second coolant conduits 128 can extend along axially distinct portions relative to the set of rotor windings 106. As used herein, "axially distinct" means the respective first or second coolant conduits 124, 128 do not overlap the other of the dual conduits 124, 128 (e.g. the dual first coolant conduits do not overlap one another or the same portion of the axially-extending set of rotor windings 106).

Further examples of the fluid coolant flow through the set of first coolant conduits 124 can be adapted based on a desired coolant flow pathway. For example, a first fluid coolant flow 140 for the set of first coolant conduits 124 can be configured such that coolant received by a respective fluid cavity 120, 122 or reservoir is delivered to only one of the set of first coolant conduits 124. As shown, the first fluid cavity 120 can deliver the first fluid coolant flow 140 to one of the first coolant conduits 124, while the second fluid cavity 122 can deliver the first fluid coolant flow 140 to the other of the first coolant conduits 124. The first fluid coolant flow 140 can then be delivered to the set of fluid outlets 141 of the respective first coolant conduit 124, to the corresponding set of radial openings 126.

In another example, a second coolant flow 142 for the first coolant conduits 124 can be configured such that coolant received by a respective fluid cavity 120, 122 or reservoir is delivered to each of the set of first coolant conduits 124. In this sense, fluid coolant flow 142 from each respective fluid cavity 120, 122 can arrive at, and be delivered to the set of fluid outlets 141 of the set of first coolant conduits 124 to the corresponding set of radial openings 126.

In yet another example, the fluid coolant flow 132 can further be adapted based on a desired coolant flow pathway for the set of second coolant conduits 128. For instance, the fluid coolant flow 132 for the set of second coolant conduits 128 can be received at an axially-centered portion of the set of second coolant conduits 128 (e.g. at the set of fluid inlets 143), and then be provided axially in one or both directions, as desired, such as to the set of fluid ports 87. Thus, the set of second coolant conduits 128, the set of first coolant conduits, the set of fluid outlets 141, the set of fluid inlets 143, the set of radial openings 126, or a combination or subset thereof, can be arranged, configured, adapted, or the like, as desired, to define one or more fluid coolant flows.

Figure 6:
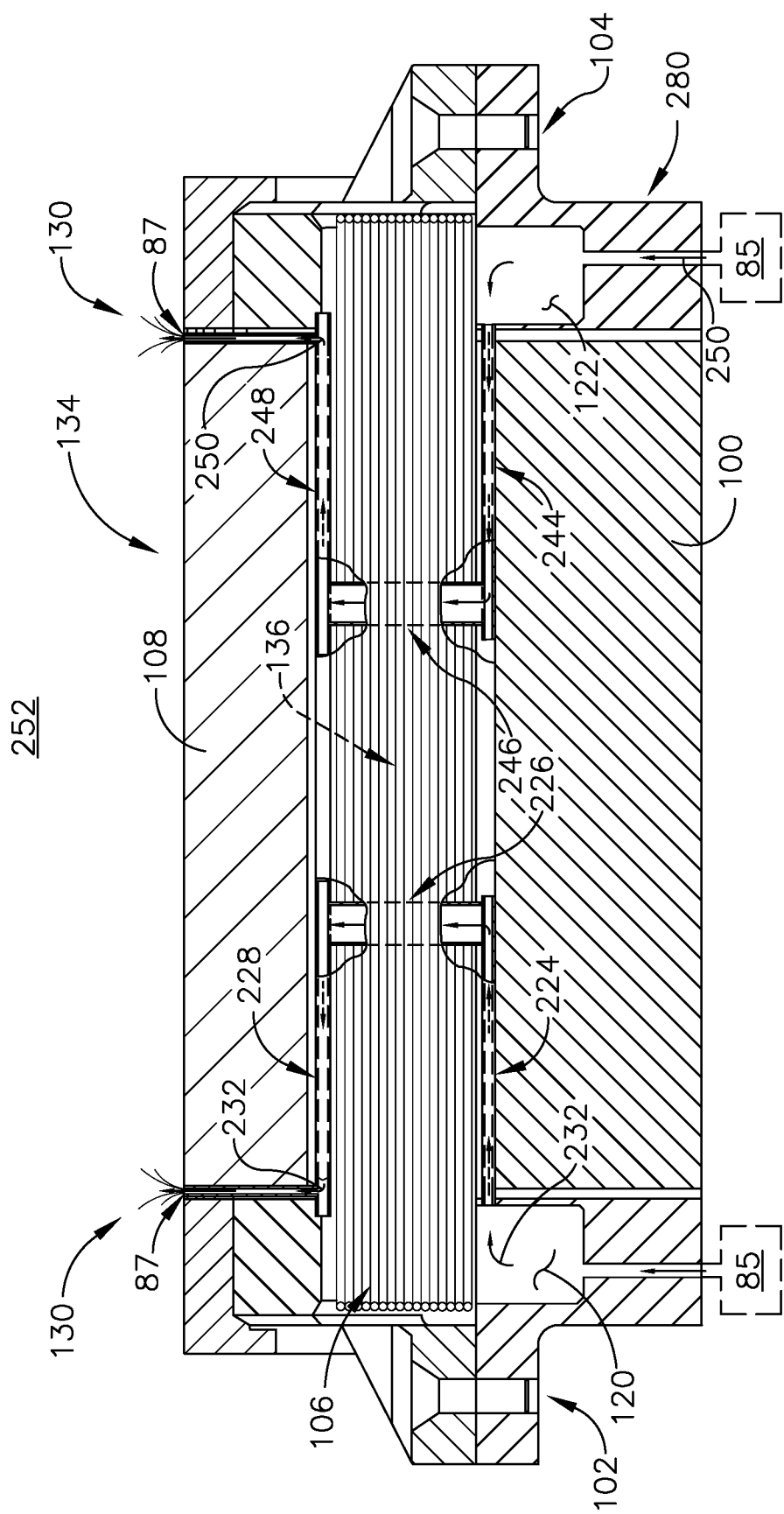
FIG. 6 illustrates a zoomed cross-sectional view of a rotor portion of a generator, including another liquid cooling circuit, in accordance with various aspects described herein.

FIG. 6 illustrates another main machine rotor 252 according to another aspect of the present disclosure. The main machine rotor 252 is similar to the main machine rotor 52; therefore, like parts will be identified with like numerals increased by 200, with it being understood that the description of the like parts of the main machine rotor 52 applies to the main machine rotor 252, unless otherwise noted. One difference is that main machine rotor 252 is illustrated having another cooling system 280 defining a distinct third fluid coolant flow 232 and a fourth coolant flow 250.

As shown, a first coolant conduit 224 can underlie a portion of the axially-extending set of rotor windings 106 proximate to the first end 102 of the main machine rotor 252, while a distinct third coolant conduit 244 can underlie a different (non-radially overlapping) portion of the axially-extending set of rotor windings 106 proximate to the second end 104. Similarly, a second coolant conduit 228 can overlie a portion of the axially-extending set of rotor windings 106 proximate to the first end 102 of the main machine rotor 252, while a distinct fourth coolant conduit 248 can overlie a different (non-radially overlapping) portion of the axially-extending set of rotor windings 106 proximate to the second end 104. In this example configuration, a first set of radial openings 226 can fluidly connect the first and second coolant conduits 224, 228 to define the third fluid coolant flow 232, while a second, axially-spaced set of radial openings 246 can fluidly connect the third and fourth coolant conduits 244, 248 to define the fourth fluid coolant flow 250. Each respective fluid coolant flow 232, 250 can be received at a different fluid output, such as different fluid ports 87, and can be delivered by different fluid sources, such as the oil flow channel 85 or respective first or second coolant cavities 120, 122.

Figure 7:
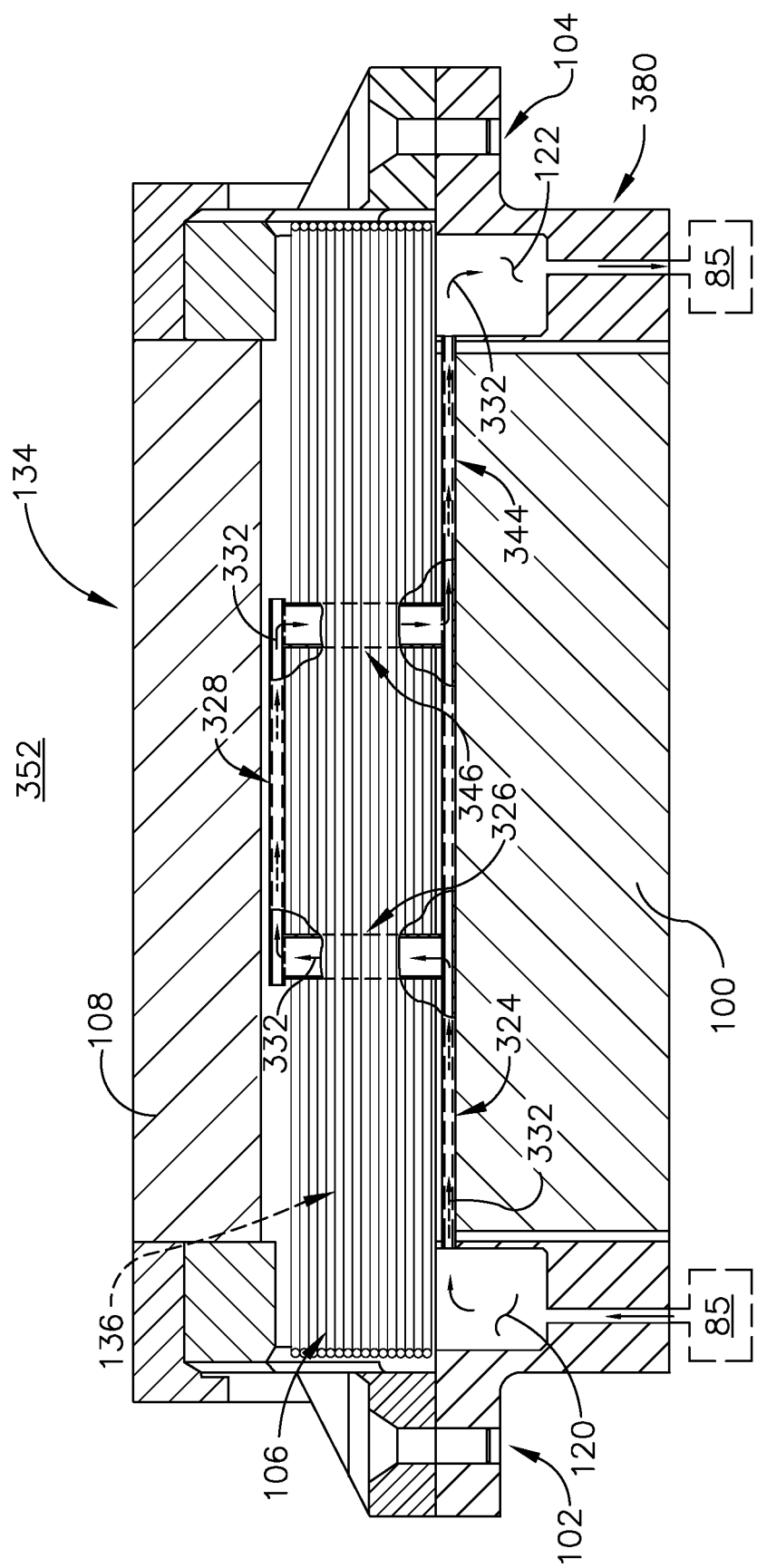
FIG. 7 illustrates a zoomed cross-sectional view of a rotor portion of a generator, including yet another liquid cooling circuit, in accordance with various aspects described herein.

FIG. 7 illustrates another main machine rotor 352 according to another aspect of the present disclosure. The main machine rotor 352 is similar to the main machine rotor 52; therefore, like parts will be identified with like numerals increased by 300, with it being understood that the description of the like parts of the main machine rotor 52 applies to the main machine rotor 352, unless otherwise noted. One difference is that main machine rotor 352 is illustrated having another cooling system 380 defining a distinct fifth coolant flow 332 applicable for a dry cavity electric machine.

As shown, a first coolant conduit 324 can underlie a portion of the axially-extending set of rotor windings 106 proximate to the first end 102 of the main machine rotor 352, while a distinct third coolant conduit 344 can underlie a different (non-radially overlapping) portion of the axially-extending set of rotor windings 106 proximate to the second end 104. A second coolant conduit 328 can also overlie a portion of the axially-extending set of rotor windings 106. In this example configuration, a first set of radial openings 326 can fluidly connect the first and second coolant conduits 324, 328 while a second, axially-spaced set of radial openings 346 can fluidly connect the second and third coolant conduits 328, 344. The fifth coolant flow 332 can define a fluid pathway starting at a coolant source, such as the oil flow channel 85, through the first coolant cavity 120, to the first coolant conduit 324, radially outward through the first set of radial openings 326 to the second coolant conduit 328, radially inward through the second set of radial openings 346 to the third coolant conduit 344, to the second coolant cavity 122, where the flow 332 can return to another coolant destination, such as the oil flow channel 85. In this sense, the fifth coolant flow 332 can define a closed coolant fluid system (e.g. a dry cavity electric machine).

Thus, as described herein, aspects of the disclosure can include a method of cooling a rotatable electric machine rotor 52, 252, 352. The method can include receiving a fluid coolant flow 132, 232, 250, 332 to a first coolant conduit 124, 224, 324 extending axially along an underlying portion of a set of rotor windings 106, wherein least one face of the first coolant conduit 124, 224, 324 is in a thermally conductive relationship with the underlying portion of the set of rotor windings 106. The method can also include delivering the fluid coolant flow 132, 232, 250, 332 to a second coolant conduit 128, 228, 328 extending axially along an overlying portion of the set of rotor windings 106, and wherein least one face of the second coolant conduit 128, 228, 328 is in a thermally conductive relationship with the overlying portion of the windings 106. The first and second coolant conduits 124, 128, 224, 228, 324, 328 can be fluidly connected by a set of radial openings 126, 226, 326 through the set of windings 106

Many other possible aspects and configurations in addition to that shown in the above figures are contemplated by the present disclosure. For example, one aspect of the disclosure contemplates coolant conduits that extend along alternative portions or lengths of the set of rotor windings 106. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The aspects disclosed herein provide method and apparatus for cooling a rotor assembly or a set of rotor windings during electric machine operations (e.g. motor or generator operations). One advantage that may be realized in the above aspects is that the above described aspects have significantly improved thermal conduction to remove heat from the rotor assembly or set of rotor windings. The improved thermal conductivity between the rotor windings and the coolant conduits coupled with the coolant paths or coolant loops provide for heat removal in a much more effective fashion from the windings to the coolant. Another advantage of the above aspects is that a higher level of power generation may be achieved without having to use a wet-cavity configuration, due to the improved heat removal of the set of rotor windings.

The increased thermal dissipation of the rotor assembly allows for a higher speed rotation, which may otherwise generate too much heat. The higher speed rotation may result in improved power generation or improved generator efficiency without increasing generator size. The described aspects having the fluid ports for the wet cavity machine are also capable of cooling the stator windings and end turn segments which further reduces thermal losses of the electric machine. Reduced thermal losses in the electric machine allow for greater efficiency and greater power density of the generator.

When designing aircraft components, important factors to address are size, weight, and reliability. The above described rotor assemblies have a decreased number of parts, making the complete system inherently more reliable. This results in possibly a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine comprising:
a rotor core having a rotatable shaft and defining rotor post;
a winding wound around the rotor post;
a set of first coolant conduits supported by the rotor core extending axially along the rotor post underlying the winding, and wherein least one face of the set of first coolant conduits is in a thermally conductive relationship with an underlying portion of the winding, the set of first coolant conduits extending along axially distinct portions of the rotor post underlying the winding;
a set of second coolant conduits supported by the rotor core extending axially along the rotor post overlying the winding, and wherein least one face of the set of second coolant conduit is in a thermally conductive relationship with an overlying portion of the winding, the set of second coolant conduits extending along axially distinct portions of the rotor post overlying the winding; and
a set of radial openings fluidly connecting at least a subset of the first coolant conduits with at least a subset of the second coolant conduits;
wherein heat from the winding is transferred by conduction to the first and the second coolant conduits.

2. The rotor assembly of claim 1 wherein the winding further includes a set of radial openings.

3. The rotor assembly of claim 2 wherein the set of radial openings fluidly connect the first coolant conduit with the second coolant conduit.

4. The rotor assembly of claim 2 wherein the set of radial openings are through-openings in the winding.

5. The rotor assembly of claim 2 wherein the set of radial openings are radial conduits.

6. The rotor assembly of claim 1 wherein the second coolant conduit is fluidly connected with a nozzle disposed at an outer radius of the rotor assembly, wherein the nozzle is adapted to direct a fluid coolant flow away from the rotor assembly.

7. The rotor assembly of claim 1 wherein the winding includes at least two axially extending winding portions, and wherein the set of first coolant conduits extend axially along the rotor post underlying the at least two axially extending winding portions, and wherein the set of second coolant conduits extend axially along the rotor post overlying the at least two axially extending winding portions.

8. The rotor assembly of claim 1, wherein a fluid conduit flow is defined sequentially by a first subset of first coolant conduits, a first subset of radial openings, a subset of second coolant conduits, a second subset of radial openings, and a second subset of first coolant conduits.

9. The rotor assembly of claim 8, wherein the first subset of radial openings is axially spaced from the second subset of radial openings.

10. A rotor assembly for an electric machine comprising:
a rotor core having a rotatable shaft and defining rotor post;
a set of rotor windings wound around the rotor post;
a first coolant conduit supported by the rotor core extending axially along the rotor post radially underlying the set of rotor windings, and wherein least one face of the first coolant conduit is in a thermally conductive relationship with a bottom portion of the set of rotor windings, the first coolant conduit extending along axially distinct portions of the rotor post underlying the set of rotor winding; and
a second coolant conduit supported by the rotor core extending axially along the rotor post radially overlying the set of rotor windings, and wherein least one face of the second coolant conduit is in a thermally conductive relationship with a top portion of the set of rotor windings, the second coolant conduits extending along axially distinct portions of the rotor post overlying the set of rotor windings;
wherein the set of rotor windings include a set of radial through-openings fluidly connecting the first cooling conduit with the second coolant conduit.

11. The rotor assembly of claim 10 wherein the second coolant conduit is fluidly connected with a nozzle disposed at an outer radius of the rotor assembly, wherein the nozzle is adapted to direct a fluid coolant flow away from the rotor assembly.

12. The rotor assembly of claim 10, further including a set of first coolant conduits extending along axially distinct portions of the rotor post underlying the winding, a set of second coolant conduits extending along axially distinct portions of the rotor post overlying the winding, and a set of radial openings fluidly connecting at least a subset of the first coolant conduits with at least a subset of the second coolant conduits.

13. The rotor assembly of claim 12 wherein the winding includes at least two axially extending winding segments, and wherein the set of first coolant conduits extend axially along the rotor post underlying the at least two axially extending winding segments, and wherein the set of second coolant conduits extend axially along the rotor post overlying the at least two axially extending winding segments.

14. The rotor assembly of claim 12, wherein a fluid conduit flow is defined sequentially by a first subset of first coolant conduits, a first subset of radial openings, a subset of second coolant conduits, a second subset of radial openings, and a second subset of first coolant conduits.

15. The rotor assembly of claim 14, wherein the first subset of radial openings is axially spaced from the second subset of radial openings.

16. The rotor assembly of claim 10 wherein the rotatable shaft defines a flow channel fluidly connected with the first coolant conduit.

17. A method of cooling a rotatable electric machine rotor, comprising:
receiving a fluid coolant flow to a first coolant conduit extending axially along an axially distinct underlying portion of a set of rotor windings, wherein least one face of the first coolant conduit is in a thermally conductive relationship with the axially distinct underlying portion of the set of rotor windings; and
delivering the fluid coolant flow to a second coolant conduit extending axially along an axially distinct overlying portion of the set of rotor windings, and wherein least one face of the second coolant conduit is in a thermally conductive relationship with the axially distinct overlying portion of the set of rotor windings, and fluidly connected with the first coolant conduit by a set of radial openings through the set of rotor windings;
wherein the fluid coolant flow removes heat from the electric machine rotor.

18. The method of claim 17, further comprising delivering the fluid coolant flow to a set of nozzles adapted to direct the fluid coolant flow toward a set of stator windings.

19. The method of claim 17, further comprising delivering the fluid coolant flow to a third coolant conduit extending axially along another underlying portion of the set of rotor windings, wherein least one face of the third coolant conduit is in a thermally conductive relationship with the another underlying portion of the set of rotor windings, and fluidly connected with the second coolant conduit by another set of radial openings through the set of rotor windings.

* * * * *